United States Patent
Jordan et al.

(10) Patent No.: US 10,392,038 B2
(45) Date of Patent: *Aug. 27, 2019

(54) VIDEO CONTENT ANALYSIS SYSTEM AND METHOD FOR TRANSPORTATION SYSTEM

(71) Applicant: Wi-Tronix, LLC, Bolingbrook, IL (US)

(72) Inventors: Lawrence B. Jordan, Bolingbrook, IL (US); Savankumar V. Patel, Bolingbrook, IL (US); Jeffrey A. Mueller, Bolingbrook, IL (US); Jagadeeswaran Rathinavel, Bolingbrook, IL (US); Roger Martinez, Bolingbrook, IL (US)

(73) Assignee: Wi-Tronix, LLC, Bolingbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/595,712

(22) Filed: May 15, 2017

(65) Prior Publication Data

US 2017/0327138 A1 Nov. 16, 2017

Related U.S. Application Data

(63) Continuation-in-part of application No. 15/595,650, filed on May 15, 2017, now Pat. No. 9,934,623, and
(Continued)

(51) Int. Cl.
*B61L 15/00* (2006.01)
*B61L 23/04* (2006.01)
(Continued)

(52) U.S. Cl.
CPC ............. *B61L 23/041* (2013.01); *B61L 3/002* (2013.01); *B61L 15/0027* (2013.01);
(Continued)

(58) Field of Classification Search
None
See application file for complete search history.

(56) References Cited

U.S. PATENT DOCUMENTS

| 5,065,321 A | 11/1991 | Bezos et al. |
| 5,377,497 A | 1/1995 | Powell |

(Continued)

FOREIGN PATENT DOCUMENTS

| CA | 2689423 | 12/2015 |
| CN | 102123274 | 3/2013 |

(Continued)

OTHER PUBLICATIONS http://www.nbcnews.com/storyline/egyptair-crash/some-airlines-stream-black-box-data-cost-keeps-others-offline-n580966?cid=eml_onsite.

*Primary Examiner* — Soo Shin
(74) *Attorney, Agent, or Firm* — Mercedes V. O'Connor; Rockman Videbeck & O'Connor

(57) ABSTRACT

A video content analysis system for mobile assets that includes track detection and infrastructure monitoring component. The track detection and infrastructure monitoring includes a reinforcement learning component, an object detection and location component, and an obstruction detection component to analyze video data, audio data, vehicle data, weather data, and route/manifest data to determine internal and/or external conditions relating to an the asset. A data acquisition and recording system uploads the data, internal and/or external condition information, object detection information, object location information, and obstruction detection information to a remote memory module and provides streaming video data in real-time to a remotely located user. Remotely located users can view the data in various view modes through a web browser or virtual reality device, which provides for quicker emergency response,
(Continued)

validates the effectiveness of repairs and rerouting, and monitors crew performance and safety.

18 Claims, 3 Drawing Sheets

Related U.S. Application Data a continuation-in-part of application No. 15/595,689, filed on May 15, 2017.

(60) Provisional application No. 62/337,225, filed on May 16, 2016, provisional application No. 62/337,228, filed on May 16, 2016, provisional application No. 62/337,227, filed on May 16, 2016.

(51) Int. Cl.

| | | |
|---|---|---|
| *B61L 27/00* | (2006.01) | |
| *B61L 3/00* | (2006.01) | |
| *G06F 16/783* | (2019.01) | |
| *G06K 9/00* | (2006.01) | |
| *G06T 7/20* | (2017.01) | |
| *G08B 13/196* | (2006.01) | |
| *H04N 5/232* | (2006.01) | |
| *H04N 7/18* | (2006.01) | |

(52) U.S. Cl.
CPC ....... *B61L 15/0072* (2013.01); *B61L 15/0081* (2013.01); *B61L 23/047* (2013.01); *B61L 27/0077* (2013.01); *B61L 27/0094* (2013.01); *G06F 16/786* (2019.01); *G06K 9/00771* (2013.01); *G06T 7/20* (2013.01); *G08B 13/19608* (2013.01); *H04N 5/23225* (2013.01); *H04N 7/18* (2013.01); *H04N 5/23238* (2013.01)

(56) References Cited

U.S. PATENT DOCUMENTS

| | | | |
|---|---|---|---|
| 5,440,336 A | 8/1995 | Buhro et al. | |
| 5,455,684 A | 10/1995 | Fujinami et al. | |
| 5,638,299 A | 6/1997 | Miller | |
| 6,109,532 A | 8/2000 | Schindler et al. | |
| 6,263,268 B1 | 7/2001 | Nathanson | |
| 6,308,044 B1 | 10/2001 | Wright et al. | |
| 6,392,692 B1 * | 5/2002 | Monroe | B64D 45/0015 340/506 |
| 6,496,777 B2 | 12/2002 | Tennison et al. | |
| 6,659,861 B1 | 12/2003 | Faris et al. | |
| 6,892,167 B2 | 5/2005 | Polan et al. | |
| 6,915,190 B2 | 7/2005 | Galasso | |
| 7,302,323 B2 | 11/2007 | Anderson et al. | |
| 7,440,848 B2 | 10/2008 | Anderson | |
| 7,640,083 B2 | 12/2009 | Monroe | |
| 7,755,479 B2 | 7/2010 | Webb, Sr. | |
| 7,761,544 B2 | 7/2010 | Manasseh et al. | |
| 7,924,153 B1 | 4/2011 | Furey et al. | |
| 7,953,425 B2 | 5/2011 | Jordan | |
| 8,081,214 B2 | 12/2011 | Vanman et al. | |
| 8,589,994 B2 | 11/2013 | Monroe | |
| 8,612,170 B2 | 12/2013 | Smith et al. | |
| 8,625,878 B2 | 1/2014 | Haas et al. | |
| 8,768,534 B2 | 7/2014 | Lentz | |
| 8,798,148 B2 | 8/2014 | Kostrzewski et al. | |
| 8,942,426 B2 | 1/2015 | Bar-Am | |
| 8,979,363 B2 | 3/2015 | Groeneweg et al. | |
| 9,003,052 B2 | 4/2015 | Holstein | |
| 9,031,791 B2 | 5/2015 | Nedilko et al. | |
| 9,049,433 B1 | 6/2015 | Prince | |
| 9,050,984 B2 | 6/2015 | Li et al. | |
| 9,191,053 B2 | 11/2015 | Ziarno et al. | |
| 9,235,765 B2 | 1/2016 | Bentley et al. | |
| 9,260,122 B2 | 2/2016 | Haas et al. | |
| 9,260,199 B2 | 2/2016 | Sundararajan et al. | |
| 9,285,294 B2 | 3/2016 | Jordan et al. | |
| 9,285,295 B2 | 3/2016 | Jordan et al. | |
| 9,313,276 B2 | 4/2016 | Pereira | |
| 9,346,476 B2 | 5/2016 | Dargy et al. | |
| 9,500,545 B2 | 11/2016 | Smith et al. | |
| 2003/0152145 A1 * | 8/2003 | Kawakita | H04N 5/77 375/240.12 |
| 2004/0027255 A1 | 2/2004 | Greenbaum | |
| 2004/0039504 A1 | 2/2004 | Coffee et al. | |
| 2006/0276943 A1 | 12/2006 | Anderson et al. | |
| 2007/0076312 A1 | 4/2007 | Jordan | |
| 2008/0176583 A1 | 7/2008 | Brachet et al. | |
| 2009/0102638 A1 | 4/2009 | Olsen et al. | |
| 2010/0023201 A1 | 1/2010 | Kinney et al. | |
| 2013/0274954 A1 | 10/2013 | Jordan, Jr. et al. | |
| 2013/0307693 A1 | 11/2013 | Stone et al. | |
| 2014/0052315 A1 | 2/2014 | Isailovski et al. | |
| 2014/0285337 A1 | 9/2014 | Gebhardt | |
| 2014/0347481 A1 | 11/2014 | Kostrzewski et al. | |
| 2015/0009331 A1 * | 1/2015 | Venkatraman | B61L 23/041 348/148 |
| 2015/0094885 A1 | 4/2015 | Dargy et al. | |
| 2015/0149118 A1 | 5/2015 | Jordan et al. | |
| 2015/0185090 A1 | 7/2015 | Groeneweg et al. | |
| 2015/0221141 A1 | 8/2015 | Negritto | |
| 2015/0225002 A1 | 8/2015 | Branka et al. | |
| 2015/0339863 A1 | 11/2015 | Allwardt et al. | |
| 2015/0363981 A1 | 12/2015 | Ziarno et al. | |
| 2016/0046308 A1 | 2/2016 | Chung et al. | |
| 2016/0073346 A1 | 3/2016 | Nicks et al. | |
| 2016/0075443 A1 | 3/2016 | Schmutz et al. | |
| 2016/0131483 A1 | 5/2016 | Jordan et al. | |
| 2018/0050800 A1 * | 2/2018 | Boykin | H04N 5/23206 |

FOREIGN PATENT DOCUMENTS

| | | |
|---|---|---|
| WO | 2004019601 | 6/2004 |
| WO | 2006128124 | 11/2006 |
| WO | 2015150369 | 10/2015 |

\* cited by examiner

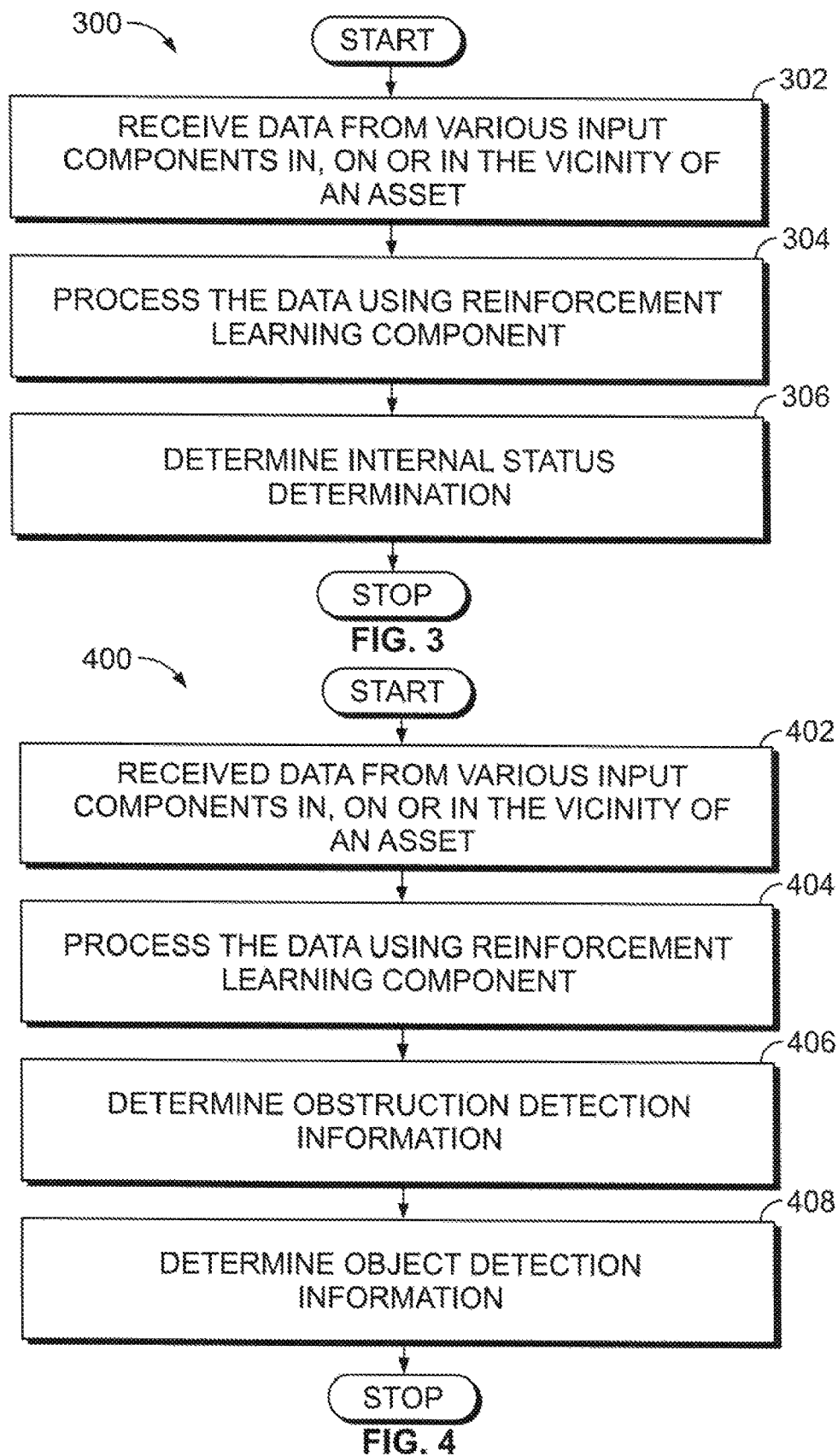

VIDEO CONTENT ANALYSIS SYSTEM AND METHOD FOR TRANSPORTATION SYSTEM

CROSS-REFERENCE TO RELATED APPLICATION(S)

This application claims priority to U.S. Provisional Application No. 62/337,225, filed May 16, 2016, claims priority to U.S. Provisional Application No. 62/337,227, filed May 16, 2016, claims priority to U.S. Provisional Application No. 62/337,228, filed May 16, 2016, is a continuation-in-part of U.S. Non-provisional application Ser. No. 15/595,650, filed May 15, 2017, and is a continuation-in-part of U.S. Non-provisional application Ser. No. 15/595,689, filed May 15, 2017, to the extent allowed by law and the contents of which are incorporated herein by reference in the entireties.

TECHNICAL FIELD

This disclosure relates to equipment used in high value assets and particularly, to real-time data acquisition and recording systems used in high value assets.

BACKGROUND

High value mobile assets such as locomotives, aircrafts, mass transit systems, mining equipment, transportable medical equipment, cargo, marine vessels, and military vessels typically employ onboard data acquisition and recording "black box" systems and/or "event recorder" systems. These data acquisition and recording systems, such as event data recorders or flight data recorders, log a variety of system parameters used for incident investigation, crew performance evaluation, fuel efficiency analysis, maintenance planning, and predictive diagnostics. A typical data acquisition and recording system comprises digital and analog inputs, as well as pressure switches and pressure transducers, which record data from various onboard sensor devices. Recorded data may include such parameters as speed, distance traveled, location, fuel level, engine revolution per minute (RPM), fluid levels, operator controls, pressures, and ambient conditions. In addition to the basic event and operational data, video and audio event/data recording capabilities are also deployed on many of these same mobile assets. Typically, data is extracted from data recorders, after an incident has occurred with an asset and investigation is required, once the data recorder has been recovered. Certain situations may arise where the data recorder cannot be recovered or the data is otherwise unavailable. In these situations, the data, such as event and operational data, video data, and audio data, acquired by the data acquisition and recording system is needed promptly regardless of whether physical access to the data acquisition and recording system or the data is unavailable.

SUMMARY

This disclosure relates generally to real-time data acquisition and recording systems used in high value assets. The teachings herein can provide real-time, or near real-time, access to video data and video content analysis related to a high value mobile asset. One implementation of a method for processing data from a mobile asset described herein includes receiving, using a video analytics component onboard the mobile asset, data based on at least one data signal from at least of: at least one data source onboard the mobile asset; and at least one data source remote from the mobile asset; processing, using a reinforcement learning component of the video analytics component, the data into processed data; sending, using the video analytics component, at least one of the data and the processed data to a data recorder onboard the mobile asset; encoding, using a data encoder of the data recorder, a record comprising a bit stream based on the processed data; and storing, using an onboard data manager of the data recorder, at least one of the data, the processed data, and the record at a configurable first predetermined rate in at least one local memory component of the data recorder.

One implementation of a system for analyzing video content described herein includes at least one of at least one 360 degree camera, at least one fixed camera, and at least one microphone; a video analytics component onboard a mobile asset, the video analytics component comprising a reinforcement learning component, an object detection and location component, and an obstruction detection component, the video analytics component configured to receive data based on at least one data signal from the at least one of the at least one 360 degree camera, the at least one fixed camera, and the at least one microphone; the reinforcement learning component configured to process the data into processed data; the object detection and location component configured to determine object detection data and object location data of a first object based on the processed data; and the obstruction detection component configured to determine obstruction detection information based on at least one of the processed data, the object detection information, and the object location information.

Variations in these and other aspects of the disclosure will be described in additional detail hereafter.

BRIEF DESCRIPTION OF THE DRAWINGS

The description herein makes reference to the accompanying drawings wherein like reference numerals refer to like parts throughout the several views, and wherein:

FIG. 3 is a flow diagram of a process for determining an internal status of the mobile asset in accordance with implementations of this disclosure; and FIG. 4 is a flow diagram of a process for determining object detection and obstruction detection occurring externally to the mobile asset in accordance with implementations of this disclosure.

DETAILED DESCRIPTION

Figure 1:
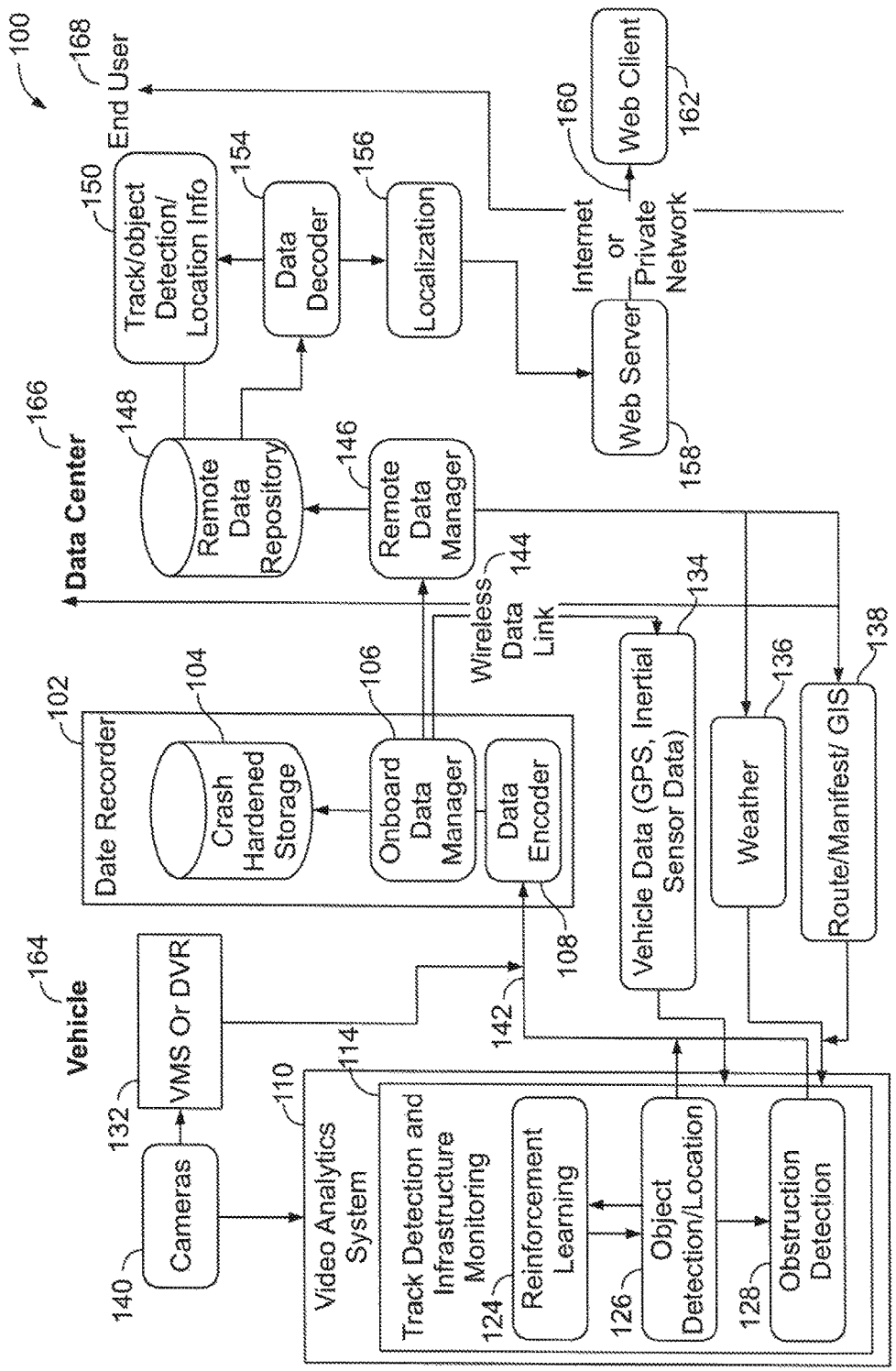
FIG. 1 illustrates a field implementation of an exemplary real-time data acquisition and recording system in accordance with implementations of this disclosure.

A real-time data acquisition and recording system and video analytics system described herein provides real-time, or near real-time, access to a wide range of data, such as event and operational data, video data, and audio data, of a high value asset to remotely located users. The data acquisition and recording system records data relating to the asset and streams the data to a remote data repository and remotely located users prior to, during, and after an incident has occurred. The data is streamed to the remote data repository in real-time, or near real-time, making information available at least up to the time of an incident or emergency situation, thereby virtually eliminating the need to locate and download the "black box" in order to investigate an incident involving the asset by streaming information to the remote data repository in real-time and making information available at least up to the time of a catastrophic event. DARS performs video analysis of video data recorded of the mobile asset to determine, for example, cab occupancy and track detection. The remotely located user may use a common web browser to navigate to and view desired data relating to a selected asset and is not required to interact with the data acquisition and recording system on the asset to request a download of specific data, to locate or transfer files, and to use a custom application to view the data.

DARS provides remotely located users access to video data and video analysis performed by a video analytics system by streaming the data to the remote data repository and to the remotely located user prior to, during, and after an incident, thereby eliminating the need for a user to manually download, extract, and playback video to review the video data to determine cab occupancy, whether a crew member or unauthorized personal was present during an incident, track detection, investigation or at any other time of interest. Additionally, the video analytics system provides cab occupancy status determination, track detection, lead and trail unit determination by processing image and video data in real-time, thereby ensuring that the correct data is always available to the user. For example, the real-time image processing ensures that a locomotive designated as the trail locomotive is not in lead service to enhance railroad safety. Prior systems provided a locomotive position within the train by using the train make-up functionality in dispatch systems. At times, the dispatch system information can be obsolete as the information is not updated in real-time and crew personnel can change the locomotive if deemed necessary.

Prior to the system of the present disclosure, inspection crews and/or asset personnel had to manually inspect track conditions, manually check if the vehicle is in the lead or trail position, manually survey the locations of each individual object of interest, manually create a database of geographic locations of all objects of interest, periodically performs manual field surveys of each object of interest to verify their location and identify any changes in geographic location that differs from the original survey, manually update the database when objects of interest change location due to repair or additional infrastructure development since the time when the original database was created, select and download desired data from a digital video recorder and/or data recorder and inspect the downloaded data and/or video offline and check tracks for any obstructions, and the vehicle operator had to physically check for any obstructions and/or switch changes. The system of the present disclosure has eliminated the need for users to perform these steps, only requiring the user to use a common web browser to navigate to the desired data. Asset owners and operators can automate and improve the efficiency and safety of mobile assets in real-time and can actively monitor the track conditions and can get warning information in real-time. The system of the present disclosure eliminates the need for asset owners and operators to download data from the data recorder in order to monitor track conditions and investigate incidents. As an active safety system, DARS can aid the operator to check for any obstructions, send alerts in real-time and/or save the information offline, and send alert information for remote monitoring and storage. Both current and past track detection information can be stored in the remote data repository in real-time to aid the user in viewing the information when required. The remotely located user may access a common web browser to navigate to desired data relating to a selected asset to view and analyze the operational efficiency and safety of assets in real-time or near real-time.

The system of the present disclosure can be used to continuously monitor objects of interest and identify in real-time when they have been moved or damaged, become obstructed by foliage, and/or are in disrepair and in need of maintenance. DARS utilizes video, image, and/or audio information to detect and identify various infrastructure objects, such as rail tracks, in the videos, has the ability to follow the tracks as the mobile asset progresses, and has the ability to create, audit against and periodically update a database of objects of interest with the geographical location. DARS can automatically inspect track conditions, such as counting the number of tracks present, identifying the current track the mobile asset is traveling on, and detecting any obstructions or defects present, such as ballast washed out, broken tracks, tracks out of gauge, misaligned switches, switch run-overs, flooding in the tracks, snow accumulations, etc., and plan for any preventive maintenance so as to avoid any catastrophic events. DARS can also detect rail track switches and follow track changes. DARS can further detect the change in the location of data including whether an object is missing, obstructed and/or not present at the expected location. Track detection, infrastructure diagnosing information, and/or infrastructure monitoring information can be displayed to a user through the use of any standard web client, such as a web browser, thereby eliminating the need to download files from the data recorder and use proprietary application software or other external applications to view the information as prior systems required. This process can be extended to automatically create, audit, and/or update a database with geographic locations of objects of interest and to ensure compliance with Federal Regulations. With the system of the present disclosure, cameras previously installed to comply with Federal Regulations are utilized to perform various tasks that previously required human interaction, specialized vehicles, and/or alternate equipment. DARS allows these tasks to be performed automatically as the mobile asset travels throughout the territory as part of normal revenue service and daily operation. DARS can be used to save countless person-hours of manual work by utilizing normal operations of vehicles and previously installed cameras to accomplish tasks which previously required manual effort. DARS can also perform tasks which previously have been performed using specialized vehicles, preventing closure of segments of track to inspect and locate track and objects of interest which often resulted in loss of revenue service and expensive equipment to purchase and maintain. DARS further reduces the amount of time humans are required to be located within the near vicinity of rail tracks, resulting in less overall accidents and potential loss of life.

Data may include, but is not limited to, measured analog and frequency parameters such as speed, pressure, temperature, current, voltage and acceleration that originates from the mobile assets and/or nearby mobile assets; measured Boolean data such as switch positions, actuator positions, warning light illumination, and actuator commands; position, speed and altitude information from a global positioning system (GPS) and additional data from a geographic information system (GIS) such as the latitude and longitude of various objects of interest; internally generated information such as the regulatory speed limit for the mobile asset given its current position; train control status and operational data generated by systems such as positive train control (PTC); vehicle and inertial parameters such as speed, acceleration, and location such as those received from the GPS; GIS data such as the latitude and longitude of various objects of interest; video and image information from at least one camera located at various locations in, on, or in the vicinity of the mobile asset; audio information from at least one microphone located at various locations in, on, or in the vicinity of the mobile asset; information about the operational plan for the mobile asset that is sent to the mobile asset from a data center such as route, schedule, and cargo manifest information; information about the environmental conditions, such as current and forecasted weather, of the area in which the mobile asset is currently operating in or is planned to operate in; and data derived from a combination of any of the above sources including additional data, video, and audio analysis and analytics.

"Track" may include, but is not limited to, the rails and ties of the railroads used for locomotive and/or train transportation. "Objects of interest" may include, but are not limited to, various objects of infrastructure installed and maintained within the nearby vicinity of railroad tracks which may be identified with the use of reinforcement learning of asset camera images and video. Reinforcement learning utilizes previously labeled data sets defined as "training" data to allow remote and autonomous identification of objects within view of the camera in, on, or in the vicinity of the mobile asset. DARS may or may not require human interaction at any stage of implementation including, but not limited to, labeling training data sets required for reinforcement learning. Objects of interest include, but is not limited to tracks, track centerline points, milepost signs, signals, crossing gates, switches, crossings, and text based signs. "Video analytics" refers to any intelligible information gathered by analyzing videos and/or images recorded from the at least one camera in, on, or in the vicinity of the mobile asset, such as, but not limited to, objects of interest, geographic locations of objects, track obstructions, distances between objects of interest and the mobile asset, track misalignment, etc. The video analytics system can also be used in any mobile asset, dwelling area, space, or room containing a surveillance camera to enhance video surveillance. In mobile assets, the video analytics system provides autonomous cab occupied event detection to remotely located users economically and efficiently.

FIG. 1 illustrates a field implementation of a first embodiment of an exemplary real-time data acquisition and recording system (DARS) 100 in which aspects of the disclosure can be implemented. DARS 100 is a system that delivers real time information, video information, and audio information from a data recorder 102 on a mobile asset 164 to remotely located end users 168 via a data center 166. The data recorder 102 is installed on the vehicle or mobile asset 164 and communicates with any number of various information sources through any combination of wired and/or wireless data links 142, such as a wireless gateway/router (not shown). Data recorder 102 gathers video data, audio data, and other data or information from a wide variety of sources, which can vary based on the asset's configuration, through onboard data links 142. The data recorder 102 comprises a local memory component, such as a crash hardened memory module 104, an onboard data manager 106, and a data encoder 108 in the asset 164. In a second embodiment, the data recorder 102 can also include a non-crash hardened removable storage device (not shown). An exemplary hardened memory module 104 can be, for example, a crashworthy event recorder memory module that complies with the Code of Federal Regulations and the Federal Railroad Administration regulations, a crash survivable memory unit that complies with the Code of Federal Regulations and the Federal Aviation Association regulations, a crash hardened memory module in compliance with any applicable Code of Federal Regulations, or any other suitable hardened memory device as is known in the art. The wired and/or wireless data links can include any one of or combination of discrete signal inputs, standard or proprietary Ethernet, serial connections, and wireless connections.

DARS 100 further comprises a video analytics system 110 that includes a track detection and infrastructure monitoring component 114. The track detection and infrastructure monitoring component 114 comprises a reinforcement learning component 124, or other neural network or artificial intelligence component, an object detection and location component 126, and obstruction detection component 128. In this implementation, live video data is captured by at least one camera 140 mounted in the cab of the asset 164, on the asset 164, or in the vicinity of the asset 164. The cameras 140 are placed at an appropriate height and angle to capture video data in and around the asset 164 and obtain a sufficient amount of the view for further processing. The live video data and image data is captured in front of and/or around the asset 164 by the cameras 140 and is fed to the track detection and infrastructure monitoring component 114 for analysis. The track detection and infrastructure monitoring component 114 of the video analytics system 110 processes the live video and image data frame by frame to detect the presence of the rail tracks and any objects of interest. Camera position parameters such as height, angle, shift, focal length, and field of view can either be fed to the track detection and infrastructure monitoring component 114 or the cameras 140 can be configured to allow the video analytics system 110 to detect and determine the camera position and parameters.

To make a status determination, such as cab occupancy detection, the video analytics system 110 uses the reinforcement learning component 124, and/or other artificial intelligence and learning algorithms to evaluate, for example, video data from cameras 140, asset data 134 such as speed, GPS data, and inertial sensor data, weather component 136 data, and route/crew, manifest, and GIS component data 138. Cab occupancy detection is inherently susceptible to environmental noise sources such as light reflecting off clouds and sunlight passing through buildings and trees while the asset is moving. To handle environmental noise, the reinforcement learning component 124, the object detection and location component 126, the obstruction detection component, asset component 134 data that can include speed, GPS data, and inertial sensor data, weather component 136 data, and other learning algorithms are composed together to form internal and/or external status determination involving the mobile asset 164. The track detection and infrastructure monitoring component 114 can also include a facial recognition system adapted to allow authorizing access to locomotive as part of locomotive security system, a fatigue detection component adapted to monitor crew alertness, and activity detection component to detect unauthorized activities such as smoking.

Reinforcement learning, using the reinforcement learning component 124, of the tracks is performed by making use of various information obtained from consecutive frames of video and/or images and also using additional information received from the data center 166 and a vehicle data component 134 that includes inertial sensor data and GPS data to determine learned data. The object detection and location component 126 utilizes the learned data received from the reinforcement learning component 124 and specific information about the mobile asset 164 and railroad such as track width and curvatures, ties positioning, and vehicle speed to differentiate the rail tracks, signs, signals, etc. from other objects to determine object detection data. The obstruction detection component 128 utilizes the object detection data received from the object detection and location component 126 and additional information from a weather component 136, a route/crew manifest data and GIS data component 138, and the vehicle data component 134 that includes inertial sensor data and GPS data to enhance accuracy and determine obstruction detection data. Mobile asset data from the vehicle data component 134 includes, but is not limited to, speed, location, acceleration, yaw/pitch rate, and rail crossings. Any additional information received and utilized from the data center 166 includes, but is not limited to, day and night details and geographic position of the mobile asset 164.

Infrastructure objects of interest, information processed by the track detection and infrastructure monitoring component 114, and diagnosis and monitoring information is sent to the data encoder 108 of the data recorder 102 via onboard data links 142 to encode the data. The data recorder 102 stores the encoded data in the crash hardened memory module 104, and optionally in the optional non-crash hardened removable storage device, and sends the encoded information to a remote data manager 146 in the data center 166 via a wireless data link 144. The remote data manager 146 stores the encoded data in a remote data repository 148 in the data center 166.

To determine obstruction detection 128 or object detection 126 such as the presence of track in front of the asset 164, the vehicle analytics system 110 uses the reinforcement learning component 124, or other artificial intelligence, object detection and location component 126, and obstruction detection component 128, and other image processing algorithms to process and evaluate camera images and video data from cameras 140 in real-time. The track detection and infrastructure monitoring component 114 uses the processed video data along with asset component 134 data that can include speed, GPS data, and inertial sensor data, weather component 136 data, and route/crew, manifest, and GIS component 138 data, to determine the external status determinations, such as lead and trail mobile assets, in real-time. When processing image and video data for track detection, for example, the video analytics system 110 automatically configures cameras 140 parameters needed for track detection, detects run through switches, counts the number of tracks, detects any additional tracks along the side of the asset 164, determines the track on which the asset 164 is currently running, detects the track geometry defects, detects track washout scenarios such as detecting water near the track within defined limits of the tracks, and detects missing slope or track scenarios. Object detection accuracy depends on the existing lighting condition in and around the asset 164. DARS 100 will handle the different lighting conditions with the aid of additional data collected from onboard the asset 164 and the data center 166. DARS 100 is enhanced to work in various lighting conditions, to work in various weather conditions, to detect more objects of interest, to integrate with existing database systems to create, audit, and update data automatically, to detect multiple tracks, to work consistently with curved tracks, to detect any obstructions, to detect any track defect that could possible cause safety issues, and to work in low cost embedded systems.

The internal and/or external status determination from the video analytics system 110, such as cab occupancy, object detection and location, such as track detection, and obstruction detection is provided to the data recorder 102, along with any data from a vehicle management system (VMS) or digital video recorder component 132, via onboard data links 142. The data recorder 102 stores the internal and/or external status determination, the object detection and location component 126 data, and the obstruction detection component 128 data in the crash hardened memory module 104, and optionally in the non-crash hardened removable storage device of the second embodiment, and the remote data repository 148 via the remote data manager 146 located in the data center 166. A web server 158 provides the internal and/or external status determination, the object detection and location component 126 information, and the obstruction detection component 128 information to a remotely located user 168 via a web client 162 upon request.

The data encoder 108 encodes at least a minimum set of data that is typically defined by a regulatory agency. The data encoder 108 receives video, image and audio data from any of the cameras 140, the video analytics system 110, and the video management system 132 and compresses or encodes and time synchronizes the data in order to facilitate efficient real-time transmission and replication to the remote data repository 148. The data encoder 108 transmits the encoded data to the onboard data manager 106 which then sends the encoded video, image, and audio data to the remote data repository 148 via the remote data manager 146 located in the data center 166 in response to an on-demand request by the user 168 or in response to certain operating conditions being observed onboard the asset 164. The onboard data manager 106 and the remote data manager 146 work in unison to manage the data replication process. The remote data manager 146 in the data center 166 can manage the replication of data from a plurality of assets 164.

The onboard data manager 108 determines if the event detected, the internal and/or external status determination, object detection and location, and/or obstruction detection, should be queued or sent off immediately based on prioritization of the event detected. For example, in a normal operating situation, detecting an obstruction on the track is much more urgent than detecting whether someone is in the cab of the asset 164. The onboard data manager 108 also sends data to the queuing repository (not shown). In near real-time mode, the onboard data manager stores the encoded data received from the data encoder 108 and any event information in the crash hardened memory module 104 and in the queueing repository. After five minutes of encoded data has accumulated in the queuing repository, the onboard data manager 106 stores the five minutes of encoded data to a remote data repository 148 via the remote data manager 146 in the data center 166 over the wireless data link 144. In real-time mode, the onboard data manager 108 stores the encoded data received from the data encoder 108 and any event information to the crash hardened memory module 104 and to the remote data repository 148 via the remote data manager 146 in the data center 166 over the wireless data link 144.

In this implementation, the onboard data manager 106 sends the video data, audio data, internal and/or external status determination, object detection and location information, obstruction detection information, and any other data or event information to the remote data repository 148 via the remote data manager 146 in the data center 166 through the wireless data link 144. Wireless data link 144 can be, for example, a wireless local area network (WLAN), wireless metropolitan area network (WMAN), wireless wide area network (WWAN), wireless virtual private network (WVPN), a cellular telephone network or any other means of transferring data from the data recorder 102 to, in this example, the remote data manager 146. The process of retrieving the data remotely from the asset 164 requires a wireless connection between the asset 164 and the data center 166. When a wireless data connection is not available, the data is stored and queued until wireless connectivity is restored.

In parallel with data recording, the data recorder 102 continuously and autonomously replicates data to the remote data repository 148. The replication process has two modes, a real-time mode and a near real-time mode. In real-time mode, the data is replicated to the remote data repository 10 every second. In near real-time mode, the data is replicated to the remote data repository 15 every five minutes. The rate used for near real-time mode is configurable and the rate used for real-time mode can be adjusted to support high resolution data by replicating data to the remote data repository 15 every 0.10 seconds. Near real-time mode is used during normal operation, under most conditions, in order to improve the efficiency of the data replication process.

Real-time mode can be initiated based on events occurring onboard the asset 164 or by a request initiated from the data center 166. A typical data center 166 initiated request for real-time mode is initiated when the remotely located user 168 has requested real-time information from the web client 162. A typical reason for real-time mode to originate onboard the asset 164 is the detection of an event or incident involving the asset 164 such as an operator initiating an emergency stop request, emergency braking activity, rapid acceleration or deceleration in any axis, or loss of input power to the data recorder 102. When transitioning from near real-time mode to real-time mode, all data not yet replicated to the remote data repository 148 is replicated and stored in the remote data repository 148 and then live replication is initiated. The transition between near real-time mode and real-time mode typically occurs in less than five seconds. After a predetermined amount of time has passed since the event or incident, predetermined amount of time of inactivity, or when the user 168 no longer desires real-time information from the asset 164, the data recorder 102 reverts to near real-time mode. The predetermined amount of time required to initiate the transition is configurable and is typically set to ten minutes.

When the data recorder 102 is in real-time mode, the onboard data manager 106 attempts to continuously empty its queue to the remote data manager 146, storing the data to the crash hardened memory module 140, and optionally to the optional non-crash hardened removable storage device of the second embodiment, and sending the data to the remote data manager 146 simultaneously.

Upon receiving video data, audio data, internal and/or external status determination, object detection and location information, obstruction detection information, and any other data or information to be replicated from the data recorder 102, the remote data manager 146 stores the data it receives from the onboard data manager 106, such as encoded data and detected event data, to the remote data repository 148 in the data center 166. The remote data repository 148 can be, for example, cloud-based data storage or any other suitable remote data storage. When data is received, a process is initiated that causes a data decoder 154 to decode the recently replicated data from the remote data repository 148 and send the decoded data to a track/object detection/location information component 150 that looks at the stored data for additional 'post-processed' events. The track/object detection/location information component 150 include an object/obstruction detection component for determining internal and/or external status determinations, object detection and location information, and obstruction detection information, in this implementation. Upon detecting internal and/or external information, object detection and location information, and/or obstruction detection information, the track/object detection/location information component 150 stores the information in the remote data repository 148.

Figure 2A:
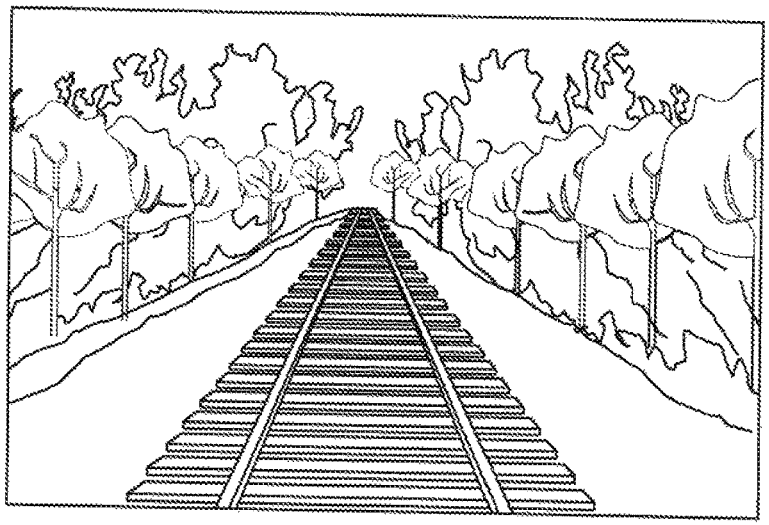
FIG. 2A is a diagram that illustrates exemplary track detection in accordance with implementations of this disclosure.
Figure 2B:
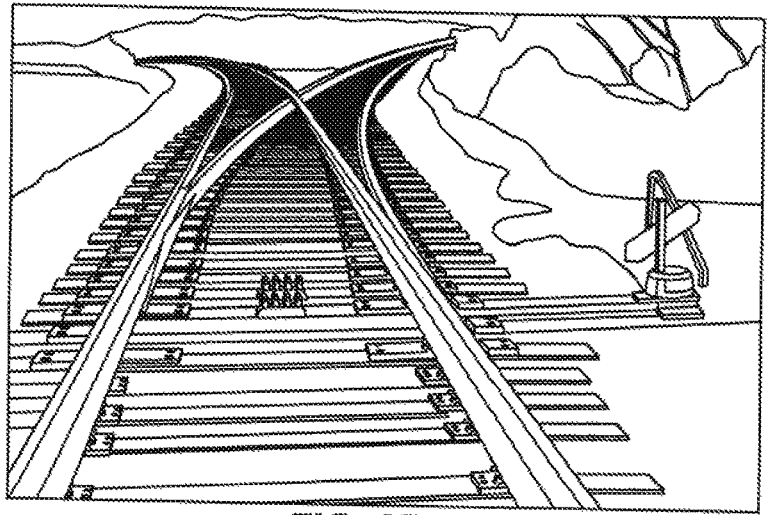
FIG. 2B is a diagram that illustrates exemplary track detection and switch detection in accordance with implementations of this disclosure.
Figure 2C:
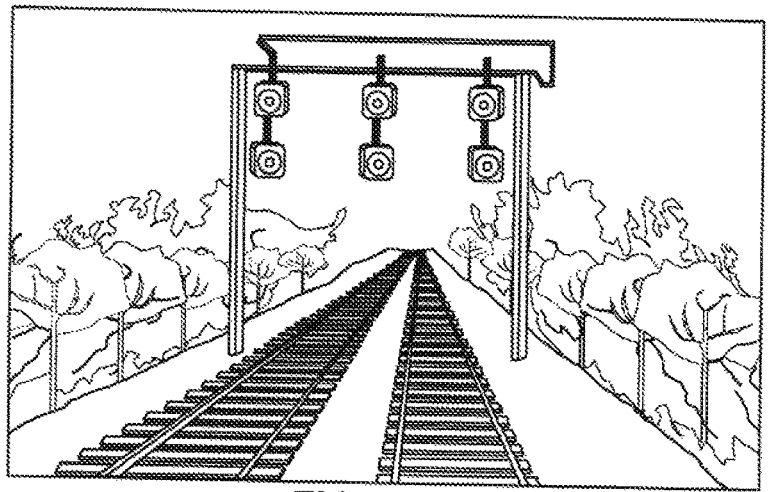
FIG. 2C is a diagram that illustrates exemplary track detection, count the number of tracks, and signal detection in accordance with implementations of this disclosure.

The remotely located user 168 can access video data, audio data, internal and/or external status determination, object detection and location information, obstruction detection information, and any other information stored in the remote data repository 148, including track information, asset information, and cab occupancy information, relating to the specific asset 164, or a plurality of assets, using the standard web client 162, such as a web browser, or a virtual reality device (not shown) which, in this implementation, can display thumbnail images of selected cameras. The web client 162 communicates the user's 168 request for information to a web server 158 through a network 160 using common web standards, protocols, and techniques. Network 160 can be, for example, the Internet. Network 160 can also be a local area network (LAN), metropolitan area network (MAN), wide area network (WAN), virtual private network (VPN), a cellular telephone network or any other means of transferring data from the web server 158 to, in this example, the web client 162. The web server 158 requests the desired data from the remote data repository 148 and the data decoder 154 obtains the requested data relating to the specific asset 164 from the remote data repository 148 upon request from the web server 158. The data decoder 154 decodes the requested data and sends the decoded data to a localizer 156. The localizer 156 identifies the profile settings set by user 168 by accessing the web client 162 and uses the profile settings to prepare the information being sent to the web client 162 for presentation to the user 168, as the raw encoded data and detected track/object detection/location information is saved to the remote data repository 148 using coordinated universal time (UTC) and international system of units (SI units). The localizer 156 converts the decoded data into a format desired by the user 168, such as the user's 168 preferred unit of measure and language. The localizer 156 sends the localized data in the user's 168 preferred format to the web server 158 as requested. The web server 158 then sends the localized data to the web client 162 for viewing and analysis, providing playback and real-time display of standard video and 360 degree video, along with the internal and/or external status determination, object detection and location information, and obstruction detection information, such as the track images and information shown in FIGS. 2A, 2B, and 2C.

The web client 162 is enhanced with a software application that provides the playback of 360 degree video in a variety of different modes. The user 168 can elect the mode in which the software application presents the video playback such as, for example, fisheye view, dewarped view, panorama view, double panorama view, and quad view.

FIG. 3 is a flow diagram showing a process 300 for determining an internal status of the asset 164 in accordance with an implementation of this disclosure. The video analytics system 110 receives data signals from various input components 302, such as cameras 140 on, in or in vicinity of the asset 164, vehicle data component 134, weather component 136, and route/manifest and GIS component 138. The video analytics system 110 processes the data signals using reinforcement learning component 304 and determines an internal status 306 such as cab occupancy.

FIG. 4 is a flow diagram showing a process 400 for determining object detection/location and obstruction detection occurring externally to the asset 164 in accordance with an implementation of this disclosure. The video analytics system 110 receives data signals from various input components 402, such as cameras 140 on, in or in vicinity of the asset 164, vehicle data component 134, weather component 136, and route/manifest and GIS component 138. The video analytics system 110 processes the data signals using the reinforcement learning component 124, the object detection/location component 126, and the obstruction detection component 128 404 and determines obstruction detection 406 and object detection and location 408 such as track presence.

For simplicity of explanation, process 300 and process 400 are depicted and described as a series of steps. However, steps in accordance with this disclosure can occur in various orders and/or concurrently. Additionally, steps in accordance with this disclosure may occur with other steps not presented and described herein. Furthermore, not all illustrated steps may be required to implement a method in accordance with the disclosed subject matter.

While the present disclosure has been described in connection with certain embodiments, it is to be understood that the invention is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for processing data from a mobile asset comprising:
   receiving, using a video analytics system onboard the mobile asset, data based on at least one data signal from at least one of:
      at least one data source onboard the mobile asset, comprising at least one of a mobile asset data component, at least one microphone, at least one fixed camera, and at least one 360 degree camera; and
      at least one data source remote from the mobile asset, comprising at least one of a weather component, a route, a manifest, and geographic information system information received from a geographic information system (GIS), and a remote data repository;
   processing, using an artificial intelligence component of the video analytics system, the data into processed data;
   sending, using the video analytics system, at least one of the data and the processed data to a data recorder onboard the mobile asset;
   encoding, using a data encoder of the data recorder, a first record based on the processed data; and
   storing, using an onboard data manager of the data recorder, at least one of the data, the processed data, and the first record at a configurable first predetermined rate in at least one local memory of the data recorder, wherein the first predetermined rate is greater than zero seconds and up to five minutes.

2. The method of claim 1, wherein the data received from the mobile asset data component includes global positioning system data received from a global positioning system (GPS) and inertial sensor data received from an inertial sensor.

3. The method of claim 1, wherein the data comprises at least one of video information received from at least one of the at least one fixed camera and the at least one 360 degree camera and audio information received from the at least one microphone.

4. The method of claim 1, further comprising:
   determining, using an object detection and location component of the video analytics system, at least one of first object detection data and first object location data of a first object based on the processed data; and
   identifying, using the object detection and location component, an internal condition involving the mobile asset based on at least one of the first object detection data on a first condition that the first object detection data was determined and the first object location data on a second condition that the first object location data was determined.

5. The method of claim 1, further comprising:
   receiving, using a digital video recorder onboard the mobile asset, multimedia data based on at least one data signal from at least one of:
      the at least one 360 degree camera;
      the at least one fixed camera; and
      the at least one microphone;
   receiving, using the data recorder, the multimedia data;
   encoding, using the data encoder of the data recorder, a second record based on the multimedia data; and
   storing, using the onboard data manager of the data recorder, at least one of the multimedia data and the second record at the configurable first predetermined rate in the at least one local memory of the data recorder.

6. The method of claim 4, further comprising:
   determining, using an obstruction detection component of the video analytics system, obstruction detection data based on at least one of the processed data, the first object detection data on a third condition that the first object detection data was determined, and first the object location data on a fourth condition that the first object location data was determined; and
   identifying, using the obstruction detection component, an external condition related to the mobile asset based on the obstruction detection data.

7. The method of claim 4, wherein at least one of the internal condition comprises cab occupancy of the mobile asset and the external condition comprises track detection.

8. The method of claim 4, further comprising:
   receiving, using the data recorder, at least one of the internal condition, the first object detection data on a third condition that the first object detection data was determined, and the first object location data on a fourth condition that the first object location data was determined;
   encoding, using the data encoder of the data recorder, a second record based on the at least one of the internal condition, the first object detection data on the third condition that the first object detection data was determined, and the first object location data on the fourth condition that the first object location data was determined; and
   storing, using the onboard data manager of the data recorder, at least one of the internal condition, the first object detection data on the third condition that the first object detection data was determined, the first object location data on the fourth condition that the first object location data was determined, and the second record at the configurable first predetermined rate in the at least one local memory of the data recorder.

9. The method of claim 6, wherein the obstruction detection data is based on a fifth condition that at least one of the first object location data, on a sixth condition that the first object location data was determined, and the first object detection data, on a seventh condition that the first object detection data was determined, corresponds to a second object location data and a second object detection data of a second object.

10. The method of claim 6, further comprising:
receiving, using the data recorder, at least one of the external condition and the obstruction detection data;
encoding, using the data encoder of the data recorder, a second record based on the at least one of the external condition and the obstruction detection data; and
storing, using the onboard data manager of the data recorder, at least one of the external condition, the obstruction detection data, and the second record at the configurable first predetermined rate in the at least one local memory of the data recorder.

11. A method for processing data from a mobile asset comprising:
receiving, using a video analytics system onboard the mobile asset, data based on at least one data signal from at least one of:
at least one data source onboard the mobile asset, comprising at least one of mobile asset data component, at least one microphone, at least one fixed camera, and at least one 360 degree camera; and
at least one data source remote from the mobile asset, comprising at least one of a weather component, a route, a manifest, and geographic information system information received from a geographic information system (GIS), and a remote data repository;
processing, using an artificial intelligence component of the video analytics system, the data into processed data;
sending, using the video analytics system, at least one of the data and the processed data to a data recorder onboard the mobile asset;
encoding, using a data encoder of the data recorder, a first record based on the processed data;
storing, using an onboard data manager of the data recorder, at least one of the data, the processed data, and the first record at a configurable first predetermined rate in at least one local memory of the data recorder; and
the first predetermined rate is configurable between zero seconds and five minutes, wherein at least one of the data, the processed data, and the first record is stored continuously in the at least one local memory of the data recorder on a first condition that the first predetermined rate is zero seconds and at least one of the data, the processed data, and the first record is stored in specified time intervals based on the first predetermined rate in the at least one local memory of the data recorder on a second condition that the first predetermined rate is greater than zero seconds and up to five minutes.

12. A method for processing data from a mobile asset comprising:
receiving, using a video analytics system onboard the mobile asset, data based on at least one data signal from at least one of:
at least one data source onboard the mobile asset, comprising at least one of mobile asset data component, at least one microphone, at least one fixed camera, and at least one 360 degree camera; and
at least one data source remote from the mobile asset, comprising at least one of a weather component, a route, a manifest, and geographic information system Information received from a geographic information system (GIS), and a remote data repository;
processing, using an artificial intelligence component of the video analytics system, the data Into processed data;
sending, using the video analytics system, at least one of the data and the processed data to a data recorder onboard the mobile asset;
encoding, using a data encoder of the data recorder, a first record based on the processed data;
storing, using an onboard data manager of the data recorder, at least one of the data, the processed data, and the first record at a configurable first predetermined rate in at least one local memory of the data recorder;
sending, using the onboard data manager, the first record to a remote data manager via a wireless data link at a configurable second predetermined rate, the second predetermined rate is configurable between zero seconds and five minutes, wherein the first record is sent continuously to the remote data manager on a first condition that the second predetermined rate is zero seconds and the first record is sent to the remote data manager in specified time intervals based on the second predetermined rate on a second condition that the second predetermined rate is greater than zero seconds and up to five minutes; and
storing, using the remote data manager, the first record in a remote data repository.

13. A system for analyzing video content comprising:
at least one of at least one 360 degree camera, at least one fixed camera, and at least one microphone;
a video analytics system onboard a mobile asset, the video analytics system comprising an artificial intelligence component, an object detection and location component, and an obstruction detection component, the video analytics system adapted to receive data based on at least one data signal from the at least one of the at least one 360 degree camera, the at least one fixed camera, and the at least one microphone, the artificial intelligence component adapted to process the data into processed data, the object detection and location component adapted to determine object detection data and object location data of a first object based on the processed data, and the obstruction detection component adapted to determine obstruction detection information based on at least one of the processed data, the object detection information, and the object location information;
a digital video recorder, onboard the mobile asset, adapted to receive data based on at least one data signal from the at least one of the at least one 360 degree camera, the at least one fixed camera, and the at least one microphone; and
a data recorder, onboard the mobile asset, comprising a data encoder, an onboard data manager, and at least one local memory, the data recorder adapted to store the data at a configurable first predetermined rate in the at least one local memory, wherein the first predetermined rate is greater than zero seconds and up to five minutes.

14. The system of claim 13, further comprising:
a vehicle data component, onboard the mobile asset, comprising a global positioning system (GPS) and an inertial sensor, the vehicle data component adapted to send at least one of GPS data received from the GPS and inertial sensor data received from the inertial sensor to the video analytics system;
a weather component adapted to send at least one of the current weather information and the forecasted weather information to the video analytics system;
geographical information system (GIS) adapted to send at least one of route information, crew information, manifest information, and GIS information to the video analytics system; and
wherein the artificial intelligence component is adapted to use at least one of the GPS data, the inertial sensor data, the current weather information, the forecasted weather information, the route information, the crew information, the manifest information, and the GIS information to process the data into processed data.

15. The system of claim 13, further comprising:
a data recorder onboard the mobile asset comprising at least one local memory, an onboard data manager, and a data encoder, the data recorder adapted to receive at least one of the processed data, the object detection information, the object location information, and the obstruction information from the video analytics system;
the data encoder adapted to encode a record based on at least one of the processed data, the object detection information, the object location information, and the obstruction information; and
the onboard data manager adapted to store at least one of the record, the processed data, the object detection information, the object location information, and the obstruction information at a configurable first predetermined rate in the at least one local memory.

16. The system of claim 15, further comprising:
a remote data manager remote from the mobile asset, the remote data manager adapted to receive the record from the onboard data manager via a wireless data link at a configurable second predetermined rate, wherein the second predetermined rate is configurable between zero seconds and five minutes; and
a remote data repository remote from the mobile asset, the remote data repository adapted to store the record received from the remote data manager.

17. The system of claim 16, further comprising:
a data decoder remote from the mobile asset, the data decoder adapted to receive the record from the remote data repository and decode the record; and
an external monitoring component remote from the mobile asset, the external monitoring component adapted to identify at least one of the object detection information, the object location information, and the obstruction information.

18. The system of claim 16, further comprising:
a web client comprising a display device;
a web server in wireless communication with the web client, the web server adapted to receive a request comprising specified data relating to the mobile asset and a specified view mode;
a localizer in wireless communication with the web server, the localizer adapted to receive the specified data from the data decoder and modify the specified data based on a time setting and unit of measure setting specified by a remote user, the specified data based on at least one of the record, the processed data, the object detection information, the object location information, and the obstruction information;
the web server adapted to receive the specified data; and
the display device adapted to display the specified data in the specified view.

* * * * *